United States Patent [19]
Bodesheim et al.

[11] 3,856,738
[45] Dec. 24, 1974

[54] ACRYLONITRILE POLYMERS WITH REDUCED SURFACE RESISTANCE

[75] Inventors: Ferdinand Bodesheim; Eduard Radlmann; Heinz Schaffner; Gunther Nischk, all of Dormagen, Germany

[73] Assignee: Bayer Aktiengesellschaft, Leverkusen, Germany

[22] Filed: Dec. 1, 1972

[21] Appl. No.: 311,372

[30] Foreign Application Priority Data
Dec. 2, 1971   Germany.......................... 2159834

[52] U.S. Cl....260/30.8 R, 260/33.2 R, 260/32.6 N, 260/513, 260/615, 260/DIG. 21
[51] Int. Cl. ............................................ C08f 45/44
[58] Field of Search.......... 260/615, 32.6 N, 85.5 R, 260/513, 33.2, 30.8, 33.2, 32.6 N

[56] References Cited
UNITED STATES PATENTS
3,376,277   4/1968   Seifert............................. 260/85.5
3,657,408   4/1972   Chinai............................. 264/182
3,660,527   5/1972   Sakai.............................. 260/85.5
3,717,689   2/1973   Tanaka........................... 260/47 U
3,743,685   7/1973   Grossean........................ 260/513 R OTHER PUBLICATIONS
Chem. Abst. 63:3113d, 1965.
Chem. Abst. 55:4982-4983a, 1961.

*Primary Examiner*—Theodore Morris
*Attorney, Agent, or Firm*—Plumley & Tyner

[57] ABSTRACT

Antistatic acrylonitrile polymers containing a polyalkylene oxide with sulfonate groups as an antistatic agent are the object of the invention. Fibres consisting of acrylonitrile polymers and 1 to 20 percent by weight of said antistatic agent show reduced surface resistance. Antistatic fibres are prepared from a spinning dope solution which comprises an organic solvent, an acrylonitrile polymer having at least 60 percent by weight of acrylonitrile and as an antistatic additive a sulfonate groups containing polyalkylene oxide compound.

7 Claims, No Drawings

ACRYLONITRILE POLYMERS WITH REDUCED SURFACE RESISTANCE

This invention relates to acrylonitrile polymers with reduced surface resistance containing a polyalkylene oxide having sulfonate groups as an antistatic additive.

The possible commercial applications of shaped products of polyacrylonitrile or acrylonitrile copolymers, particularly fibres, are severely restricted by the very troublesome electric charge taken up by these polymers which have surface resistances of over $10^{12}$ Ohm.

Several attempts have been described to provide polyacrylonitrile polymers with antistatic finishes which reduce their surface resistance to less than $10^{12}$ Ohm, either by applying antistatic preparations to the finished shaped products or by incorporating such preparations in the polymer melts or solutions before they are shaped. It has in practice been found that the method of applying antistatic finishes to the shaped products after shaping is less useful because a permanent effect is impossible due to mechanical or solvolytic influences.

Much better results are obtained by mixing a polyacrylonitrile polymers with suitable substances. Antistatic additives incorporated with the said polymers must be compatible with the high molecular weight compounds and resistant to influences such as temperature during the shaping process of the polymer and must also be resistant to elution or removal from the shaped products by evaporation.

The antistatic additives previously known belong to the following classes of compounds: Ureas, dithiocarbonates, phosphoric acid amides, aminocarboxylic acid amides and special polyalkylene oxide compounds with sulphonate groups represented by the following general formula:

$$X + O-CH_2-CHR_m + O-(CH_2)_n-SO_3M$$

in which X is $$-(CH_2)_n-SO_3M$$

or

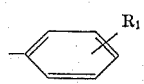

R an alkyl radical, $R_1$ a $C_4$–$C_{12}$-alkyl, M an alkali metal or alkaline earth metal and m and n integers. Among the various types of compounds mentioned above, the last mentioned polyalkylene oxide derivatives meet substantially all the requirements mentioned above. If such compounds are added to polyacrylonitrile polymers in quantities of 1 to 20 percent by weight, the surface resistance of threads produced from such polyacrylonitrile polymers is still $10^{11}$ Ohm even after 10 washing operations.

It is an object of the invention to improve the surface resistance of acrylonitrile polymers by incorporating special polyalkylene oxide derivatives with sulphonate groups in acrylonitrile polymers. This excellent antistatic effect can also be observed to some extent if these additives are added to other organic synthetic polymers.

This invention thus relates to antistatic acrylonitrile polymers having at least 60 percent by weight of acrylonitrile containing as an antistatic agent, 1 to 20 percent by weight, based on the total weight of the composition of a polyalkylene oxide compound with sulfonate groups of the formula

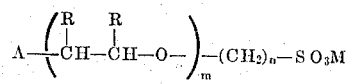

in which R represents hydrogen or a methyl radical, A represents the radicals $R_1-O-$,

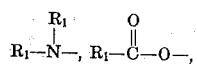

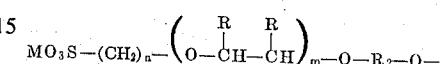

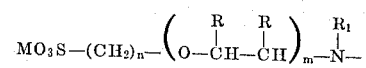

and

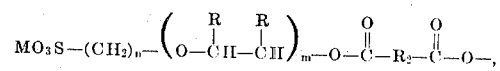

in which R has the meaning mentioned above and $R_1$ denotes $C_1$–$C_{30}$-alkyl radical and $R_2$ represents $C_3$–$C_{30}$-alkylene radical, M denotes an alkali metal, an alkaline earth metal, $NH_4$ or an alkyl ammonium radical, m represents an integer of from 1 – 150 and n represents an integer of from 1–6.

Preferably polyalkylenoxide compounds are used as antistatic agents having the following formula:

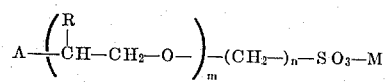

wherein A represents the radical $CH_3-(CH_2)_n-O-$,

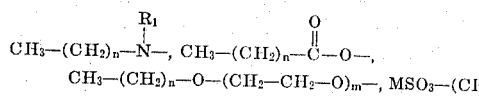

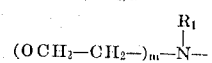

$$MSO_3-(CH_2)_n-(OCH_2-CH_2)_m-O-(CH_2)_n-O-,$$

or

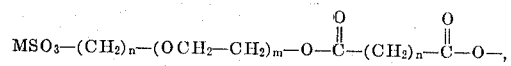

R hydrogen or methyl, $R_1$ $C_1$–$C_{18}$-alkyl, $m$ an integer from 5 to 35, $n$ an integer from 2 to 18 and M sodium, potassium or lithium. Another object of the invention are antistatic fibres of acrylonitrile polymers consisting essentially of one acrylonitrile polymer having at least 60 percent by weight of acrylonitrile and incorporated therein as an antistatic agent 1 to 20 percent by weight of said sulphonate groups containing polyalkylene oxide compound. The fibres may be produced by known spinning technique p.i. by spinning a solution of the polymers in an organic solvent according to the dry- or wet-spinning process.

The antistatic agents used according to the invention are prepared in known manner by reacting aliphatic compounds such as alcohols, secondary amines, carboxylic acids, diols primary amines or dicarboxylic acids with an alkylene oxide, preferably ethylene oxide and propylene oxide, at temperatures between 0° and 150°C to produce compounds of the general formula $$A\left(\begin{array}{c}R\\|\\CH\end{array}-\begin{array}{c}R\\|\\CH\end{array}-O\right)_m H,$$

in which A, R and m have the meanings indicated above, these polyalkyleneglycol derivatives which may be in the form of a solution in an inert solvent, being then converted into the corresponding alcoholates in an atmosphere of inert gas, these alcoholates then being reacted at temperatures of 50° to 200°C with a sultone of the general formula $$\underset{O\underline{\qquad}SO_2}{\overset{(CH_2)_n}{\diagup\diagdown}}$$

in which n has the meaning indicated above or with an ω-halogen-alkanesulphonate of the general formula $$Hal-(CH_2)_n-SO_3M$$

in which Hal stands for chlorine or bromine and M and n have the meanings indicated above. Suitable inert solvents are, e.g., aromatic hydrocarbons such as benzene, toluene or xylene or aliphatic and cycloaliphatic esters such as diethylether, tetrahydrofuran or dioxane. The inert gas used may be nitrogen, hydrogen or a noble gas. The alcoholates may be prepared by reacting equivalent quantities of an alkali metal with the polyethylene glycol in the melt but it is preferable to add the calculated quantity of the alcoholate of a low boiling alcohol such as methanol or ethanol to the polyglycol and then distil off the lower alcohol under reduced pressure. One may, of course, also use mixtures of the aliphatic starting materials for the reaction with an alkylene oxide or alkylene oxide mixture. The periodic action of various alkylene oxides results in segment polyaddition compounds.

The following are given as examples of suitable antistatic additives according to the invention:

$$CH_3-(CH_2)_{11}-O-(CH_2-CH_2-O-)_{10}-(CH_2-)_3-SO_3Na \quad (1)$$

$$CH_3-(CH_2)_{17}-\overset{\overset{CH_3}{|}}{N}-(CH_2-CH_2-O-)_{20}-(CH_2)_2-SO_3Li \quad (2)$$

$$CH_3-(CH_2)_{16}-\overset{O}{\overset{\|}{C}}-O-(CH_2-CH_2-O)_{35}-(CH_2)_4-SO_3K \quad (3)$$

$$NaO_3S-(CH_2)_3-(O-CH_2-CH_2)_6-O-(CH_2)_{12}-O-(CH_2-CH_2-O)_6-(CH_2)_3-SO_3Na \quad (4)$$

$$NaO_3S-(CH_2)_4-(O-CH_2-CH_2-)_5-\overset{\overset{C_{18}H_{36}}{|}}{N}-(CH_2-CH_2-O)_5-(CH_2)_4-SO_3Na \quad (5)$$

$$KO_3S-(CH_2)_2-(O-CH_2-CH_2)_{30}-O-\overset{O}{\overset{\|}{C}}-$$
$$(CH_2)_{10}-\overset{O}{\overset{\|}{C}}-O-(CH_2-CH_2-O)_{30}-(CH_2)_2-SO_3K \quad (6)$$

$$CH_3-(CH_2)_{17}-O-(CH_2-CH_2-O)_{27}-(\overset{\overset{CH_3}{|}}{C}H-CH_2-O)_3-(CH_2)_3-SO_3Na \quad (7)$$

The antistatic compounds according to the invention are compatible with solutions of acrylonitrile polymers and can be mixed with them without any separation occurring. Even stabilisers, fillers, dyes, pigments, antioxidants or the like may also be added without separation occurring and without reduction of the antielectrostatic effect.

A spinning dope solution for producing an antistatic fibre containing an acrylonitrile polymer having at least 60 percent by weight of acrylonitrile and 1 to 20 percent by weight, calculated on the total amount of polymer composition of the sulphonate groups containing polyalkylene oxide compound, said polymer and antistatic agent are dissolved in an polar organic solvent to form a 15 to 30 percent by weight solution, can be processed into fibres without any difficulty.

Suitable acrylonitrile polymers for the purpose of this invention, apart from pure polyacrylonitrile, are those acrylonitrile polymers which contain at least 60 percent by weight of polymerised acrylonitrile and up to 40 percent by weight of other copolymerisable compounds taken from the group of vinyl and (meth)acrylic compounds in a copolymerised form.

The following are mentioned as examples of copolymerisable compounds: (Meth)acrylic acid esters, (meth)acrylic acid amides, vinyl chloride, vinylidene chloride and those copolymerisable compounds which increase the affinity for acidic or basic dyes p.i. methallyl sulfonic acid.

Suitable solvents for preparing spinning solutions are any solvents which can be used for polyacrylonitrile, especially dimethylformamide.

It is a great advantage that the surface resistance of fibres which contain the antistatic agents according to the invention does not change substantially even after repeated washing with alkaline detergents. Apart from their excellent antistatic properties, the acrylonitrile polymers according to the invention are distingueshed by their high affinity for basic dyes and their considerably improved water uptake capacity.

In the following examples, the parts by weight are related to parts by volume as kilogram to litre.

Preparation of the antistatic additives

A. 121.4 Parts by weight of an anhydrous ethoxylated stearyl alcohol having an average molecular weight of $\overline{M}n = 1,214$ (calculated from the OH number) are melted and 5.4 parts by weight of sodium methylate in 150 parts by volume of absolute methanol are added. The methanol is then distilled off to constant weight in a vacuum produced by a water jet pump, at a bath temperature of 125°C. After flushing out with nitrogen, 12.2 parts by weight of propane sultone are added and the reaction mixture is heated to 150°C for 2 hours. After cooling, an almost colourless, waxy product corresponding to the following composition formula $$CH_3-(CH_2)_{17}-O-(CH_2-CH_2-O)_{21}-(CH_2-)_3-SO_3Na$$

is obtained in quantitative yield.

B. 39.1 Parts by weight of potassium are dissolved in 702.0 parts by weight of an anhydrous ethoxylated palmitic acid with an average molecular weight of $\overline{M}n = 702$ (calculated from the OH number) under an atmosphere of nitrogen. After heating the solution to 150°C, 136.0 parts by weight of butane sultone are added dropwise and the reaction mixture is stirred for 1½ hours at this temperature. The melt solidifies on cooling to a pale yellow wax of the following composition

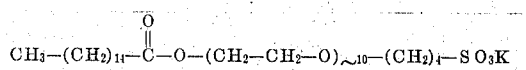

C. 165.8 Parts by weight of a segmented polyaddition product obtained by reacting stearyl alcohol first with 27 mols of ethylene oxide and then with 3 mols of propylene oxide, which polyaddition product has an average molecular weight of Mn = 1658 (calculated from the OH number) are reacted with 2.3 parts by weight of sodium in 800 parts by volume of absolute dioxane at reflux temperature under an atmosphere of nitrogen. As soon as evolution of hydrogen has ceased, 13.6 parts by weight of butane sultone are added dropwise at constant temperature and the reaction mixture is stirred for 6 hours. The dioxane is then distilled off under vacuum. After cooling, a colourless waxy mass which has the following composition

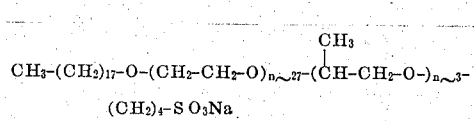

remains.

D. A solution of 80 parts by weight of sodium hydroxide in 150 parts by volume of water is added dropwise in the course of 2 hours to a dispersion of 845.0 parts by weight of an ethoxylated stearylamine with an average molecular weight of Mn = 845 (calculated from the OH number) and 333.0 parts by weight of the sodium salt of 2-chloro-ethane-sulphonic acid at 40°C. Stirring is then continued for 3 hours at 50°C until the reaction solution is neutral in reaction. The water is then distilled off under a vacuum produced by a water jet pump and the residue is taken up with 1,500 parts by volume of dimethylformamide and filtered to remove insoluble sodium chloride. The dimethylformamide solution may be added to the polyacrylonitrile solutions without isolating the antistatic reaction product, which has the following composition:

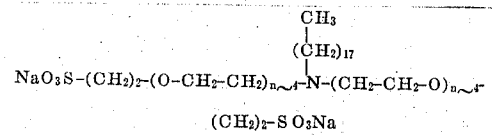

EXAMPLE 1

The antistatic agents described in A to D are added in varying quantities to a 27 percent solution in dimethylformamide of a polyacrylonitrile copolymer of 94 parts by weight of acrylonitrile, 5 parts by weight of methyl acrylate and 1 part by weight of the sodium salt of methallysulphonic acid which has a K-value of 83 (according to Fikentscher, Cellulose-chemie 13 (1932), 58). The solutions are spun by the dry spinning process in known manner. The surface resistance of the stretched threads is measured after air conditioning at 23°C and 50 percent relative humidity. After determination of the initial surface resistance, the threads are washed with a 0.5 percent solution of a commercial detergent at 40°C. Before the subsequent measurements, the threads are dried and again air conditioned.

The results are summarised in Table 1 below and compared with those obtained with threads produced from the above mentioned copolymer without the addition of an antistatic agent.

Table 1

| Antistatic additive | Surface resistance at 23°C and 50% relative humidity [Ω] | | |
|---|---|---|---|
| | After stretching | After 5 washings | After 10 washings |
| none | > $10^{13}$ | > $10^{13}$ | > $10^{13}$ |
| 5% by weight of A | 5 . $10^9$ | 9 . $10^9$ | 1 . $10^{10}$ |
| 10% by weight of A | 3 . $10^9$ | 6 . $10^9$ | 9 . $10^9$ |
| 7% by weight of B | 3 . $10^8$ | 8 . $10^9$ | 1 . $10^{10}$ |
| 10% by weight of C | 4 . $10^9$ | 5 . $10^{10}$ | 3 . $10^{11}$ |
| 10% by weight of D | 9 . $10^8$ | 1 . $10^9$ | 9 . $10^9$ |

EXAMPLE 2

The antistatic agents described under A to D are added in varying quantities exactly as described in Example 1 to a 27 percent solution in dimethylformamide of a polyacrylonitrile copolymer of 61.3 parts by weight of acrylonitrile, 37 parts by weight of vinylidene chloride and 1.7 parts by weight of methallylsulphonic acid sodium, which has a K-value of 81 (according to Fikentscher, Cellulosechemie 13 (1932), 58). In the same way as described in Example 1, the solution is spun into threads, the surface resistance of the threads is determined and the threads are washed.

The results are summarised in Table 2.

Table 2

| Antistatic additive | Surface resistance at 23°C and 50% relative humidity [Ω] | | |
|---|---|---|---|
| | After stretching | After 5 washings | After 10 washings |
| none | > $10^{13}$ | > $10^{13}$ | > $10^{13}$ |
| 10% by weight of A | 6 . $10^9$ | 8 . $10^9$ | 5 . $10^{10}$ |
| 10% by weight of B | 4 . $10^9$ | 5 . $10^9$ | 8 . $10^9$ |
| 10% by weight of D | 8 . $10^9$ | 8 . $10^9$ | 2 . $10^{10}$ |

What we claim is:

1. An antistatic acrylonitrile polymer composition which has incorporated therein an acrylonitrile polymer having at least 60 percent by weight of acrylonitrile and as an antistatic agent 1 to 20 percent by weight, based on the total weight of the polymer composition of a sulphonate groups containing polyalkylenoxide compound of the formula

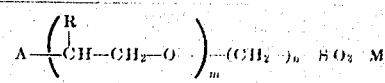

wherein
R represents hydrogen or a methyl radical,
A represents the radicals $$R_1-\overset{R_1}{\underset{|}{N}}-, \quad R_1-\overset{O}{\underset{\|}{C}}-O-,$$

$$MO_3S-(CH_2)_n-\left(O-\overset{R}{\underset{|}{C}H}-\overset{R}{\underset{|}{C}H}\right)_m-\overset{R_1}{\underset{|}{N}}- \text{ and}$$

$$MO_3S-(CH_2)_n-(O-\overset{R}{\underset{|}{C}H}-\overset{R}{\underset{|}{C}H})_m-O-\overset{O}{\underset{\|}{C}}-R_2-\overset{O}{\underset{\|}{C}}-O-,$$

in which $R_1$ represents $C_1$–$C_{30}$–alkyl, $R_2$ $C_3$–$C_{30}$-alkylene radical, M an alkali metal or alkaline earth metal or an ammonium or alkylammonium radical, $m$ represents an integer of from 1 to 150 and $n$ represents an integer of from one to 6.

2. The antistatic acrylonitrile polymer composition of claim 1, in which the acrylonitrile polymer is a copolymer from acrylonitrile and vinyl, acrylic or allyl compounds.

3. The antistatic acrylnitrile polymer composition of claim 1, in which the acrylonitrile polymer is a copolymer from acrylonitrile, methyl acrylate and methallysulphonic acid.

4. The antistatic acrylonitrile polymer composition of claim 1, in which the acrylnitrile polymer is a copolymer from acrylonitrile, vinylidene chloride and methallylsulphonic acid.

5. Antistatic fibres of acrylonitrile polymers consisting essentially of an acrylonitrile polymer having at least 60 percent by weight of acrylonitrile and incorporated therein as an antistatic agent 1 to 20 percent by weight based on the total amount of the polymer composition of a sulphonate groups containing polyalkylene oxide compound of the formula $$A-\left(-\overset{R}{\underset{|}{C}H}-CH_2-O-\right)_m-(CH_2)_n-SO_3-M$$

wherein R represents hydrogen or a methyl radical, A represents the radicals $$R_1-\overset{R_1}{\underset{|}{N}}-, \quad R_1-\overset{O}{\underset{\|}{C}}-O-,$$

$$MO_3S-(CH_2)_n-\left(O-\overset{R}{\underset{|}{C}H}-\overset{R}{\underset{|}{C}H}\right)_m-\overset{R_1}{\underset{|}{N}}- \text{ and}$$

$$MO_3S-(CH_2)_n-(O-\overset{R}{\underset{|}{C}H}-\overset{R}{\underset{|}{C}H})_m-O-\overset{O}{\underset{\|}{C}}-R_2-\overset{O}{\underset{\|}{C}}-O-,$$

in which $R_1$ represents $C_1$–$C_{30}$-alkyl, $R_2$ $C_3$–$C_{30}$-alkylene radical, M an alkali metal or alkaline earth metal or an ammonium or alkylammonium radical, m represents an integer of from 1 to 150 and n represents an integer of from 1 to 6.

6. A spinning dope solution for preparing an antistatic fibre of acrylonitrile polymers of claim 5 comprising a polar organic solvent, an acrylonitrile polymer having at least 60 percent by weight of acrylonitrile and 1 to 20 percent by weight, based on the total amount of the polymer composition of a sulphonate groups containing polyalkylene oxide compound as solutes to form a 15 to 30 percent solution by weight of said solutes in said solvent.

7. The spinning dope solutions of claim 6, wherein said solvent is dimethyl formamide.

* * * * *

UNITED STATES PATENT OFFICE
CERTIFICATE OF CORRECTION

PATENT NO. : 3,856,738
DATED : Ferdinand Bodesheim et al.
INVENTOR(S) : December 24, 1974

It is certified that error appears in the above-identified patent and that said Letters Patent are hereby corrected as shown below:

| COLUMN | LINE | ERROR |
|---|---|---|
| 1 | 24 | "a" after mixing should be deleted. |
| 1 | first formula | "$X\text{-}[O\text{-}CH_2\text{-}CHR]_m\text{-}O - (CH_2)_n\text{-}SO_3M$" should be --- $X\text{-}[O\text{-}CH_2\text{-}CHR]_m\text{-}O - (CH_2)_n\text{-}SO_3M$ ---. |
| 5 | 13 | "Mn" should be --- $\bar{M}n$ ---. |
| 5 | 18 | After "dropwise" insert --- at ---. |
| 5 | 32 | "845 (" should be --- 845.0 ---. |
| 5 | 34 | "Mn" should be --- $\bar{M}n$ ---. |
| 7 | Claim 3 line 1 | "acrylnitrile" should be --- acrylonitrile ---. |
| 7 | Claim 4 line 2 | "acrylnitrile" should be --- acrylonitrile ---. |

Signed and sealed this 17th day of June 1975.

(SEAL)
Attest:

RUTH C. MASON
Attesting Officer

C. MARSHALL DANN
Commissioner of Patents
and Trademarks